L. LEAVER.
DRAFT EQUALIZER.
APPLICATION FILED NOV. 26, 1915.
1,226,541.
Patented May 15, 1917.
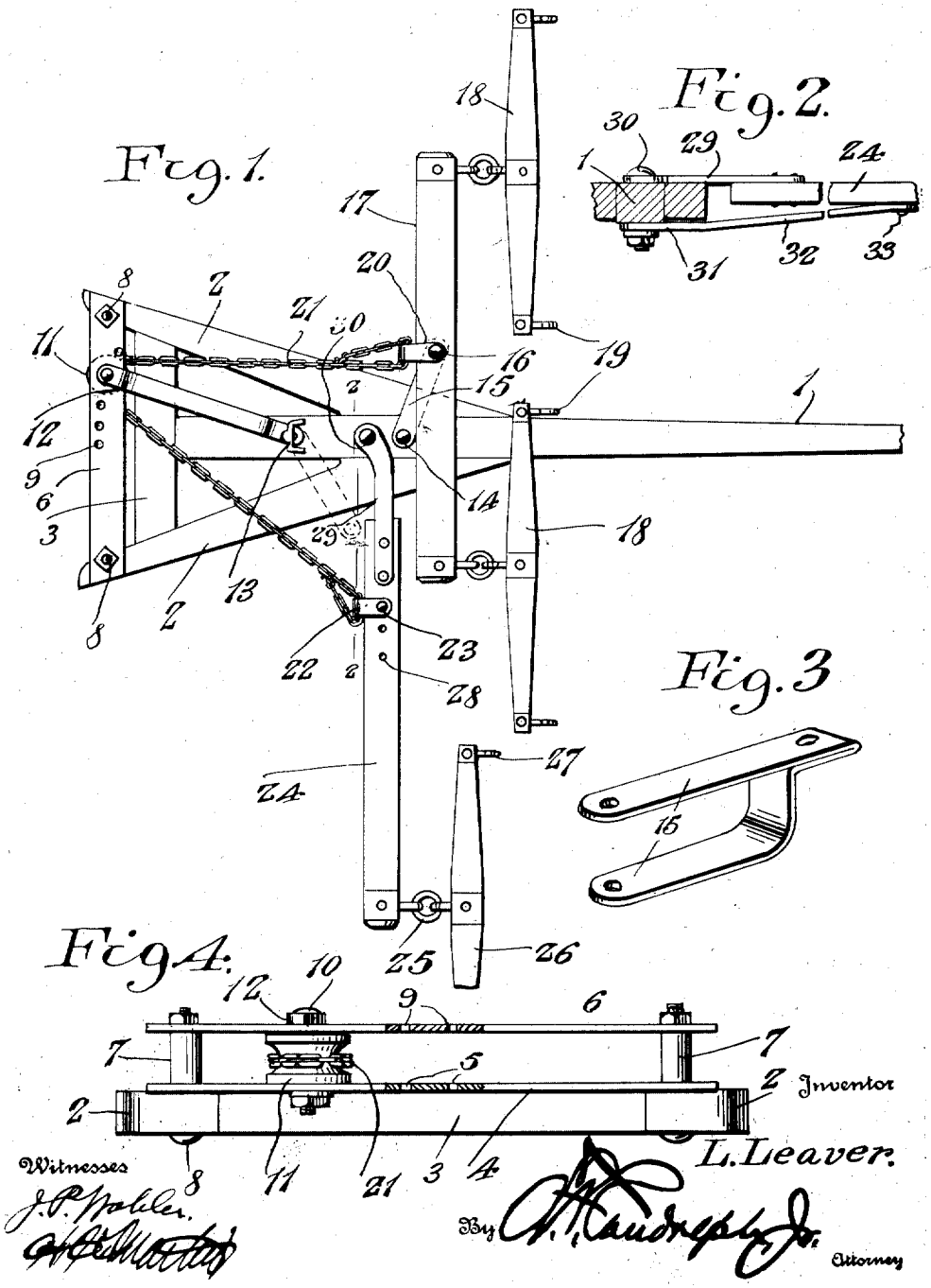

UNITED STATES PATENT OFFICE.

LEWIS LEAVER, OF ARMSTRONG, IOWA.

DRAFT-EQUALIZER.

1,226,541. Specification of Letters Patent. Patented May 15, 1917.

Application filed November 26, 1915. Serial No. 63,592.

*To all whom it may concern:*

Be it known that I, LEWIS LEAVER, a citizen of the United States, residing at Armstrong, in the county of Emmet and State of Iowa, have invented certain new and useful Improvements in Draft-Equalizers; and I do hereby declare the following to be a full, clear, and exact description of the invention, such as will enable others skilled in the art to which it appertains to make and use the same.

This invention relates to new and useful improvements in draft equalizers and the principal object of the invention is to provide a device which will enable the user to hitch three draft animals abreast and equalize the load on each.

Another object of the invention is to provide a device which is adapted to be used in connection with an ordinary wagon having the usual draft pole or tongue without the necessity of substituting shafts or the like, therefor.

With these and other objects in view, the invention consists in the novel combination and arrangement of parts which will be fully set forth in the following specification and accompanying drawings, in which:

Figure 1 is a plan view of a portion of a pole showing this improved evener attached thereto.

Fig. 2 is a fragmentary transverse sectional view on line 2—2 of Fig. 1.

Fig. 3 is a detail perspective view of the arm to which the whiffle tree is connected, and Fig. 4 is a rear view partly in section of the rear end of the tongue showing the roller carrying plate mounted thereon.

Referring to the drawings, the numeral 1 designates the tongue or the pole provided at its rear end with the usual braces 2, which are connected by a bar 3. Secured to the upper side of the bar is a strip 4 which is provided with a plurality of spaced openings 5 arranged arcuately. A suitable strip 6 similar to the strip 4 is held in spaced parallel relation to the strip 4 by the spaces 7 and bolts 8. This bar like the bar or strip 4 is provided with the apertures 9 which are arranged arcuately and so positioned with relation to the strip 4 as to be in alinement with the openings 5 formed therein. A suitable pin or bolt 10 is adapted to extend through the alining openings 9 and 5 and rotatably mount the pulley wheel 11 over which the equalizer chain passes. A suitable brace bar 12 is connected to the bolt 10 and is pivoted at 13 to the pole 1 intermediate its rear end at the point where it joins the bar 3.

Pivotally mounted at 14 to the pole at a point in advance of the pivots 13 is the link 15, the rear end of which is bifurcated and the arms of said bifurcated portion are pivoted to the pole, while the forward end of the link is pivoted at 16 to the double tree 17. The opposite ends of this double tree carry the usual swingle tree 18 to the ends of which the trace hooks 19 are secured. A suitable U-shaped bail or stub 20 is pivotally connected at 16 to the whiffle tree and forms a connection for the chain or flexible member 21 which is looped therethrough and passes over the pulley 11 hereinbefore referred to. The opposite end of said chain is looped through a similar connection 22 pivoted at 23 to the coöperating equalizer bar which will be more fully hereinafter described.

The equalizer bar above referred to is designated by the numeral 24 and carries at its outer end a suitable connection 25 for the swingle tree 26 carrying at its ends the trace connection 27. The inner end of the bar 24 is provided with a plurality of openings 28 so that the pivot point 23 of the U-shaped clip or attaching element 22 may be adjusted. A suitable connecting element 29 is riveted or otherwise secured to the upper side of the bar 24 and is pivoted to the upper side of the pole at a point intermediate the pivots 13 and 14 by means of a suitable bolt 30 which extends through said pole and through the attaching element 31 on the under side of the pole which is bent upwardly and angularly as at 32 and attached at 33 to the under side of the bar 24.

It will be apparent from the foregoing that in use the pull of the draft animals on the swingle trees 18 will exert pull on the chain 21 and thus tend to swing the bar 24 rearwardly. The draft animal attached to the swingle tree 26 will offset the pull of the draft animals on the swingle trees 18, thereby evenly distributing the load over all of the animals.

While in the foregoing there has been shown and described the preferred embodiment of this invention, it is to be understood that such changes may be made in the combination and arrangement of parts as will fall within the spirit and scope of the appended claim.

What is claimed is:—

In a draft equalizer, the combination with an ordinary vehicle pole and braces attached to and diverging from the rear end of the pole, of a pair of vertically spaced strips attached to said braces, a pulley rotatably mounted between said strips, said strips provided with a plurality of openings to permit the adjusting of the position of said pulley with respect to said pole, a brace pivotally connected to said pole and the uppermost of said strips directly above said pulley, a link pivotally connected to said pole forwardly of said strips and extending outwardly and forwardly from the pole, a doubletree connected to the outer free end of said link, a bar pivotally connected to said pole rearwardly of said link and extending outwardly from the pole oppositely to the link, an equalizing bar connected to said bar, a brace connected to the under surface of equalizing bar and said pole, and a flexible member connected to said doubletree, extending about said pulley and adjustably connected to said equalizing bar intermediately of its ends.

In testimony whereof I affix my signature in presence of two witnesses.

LEWIS LEAVER.

Witnesses:
SAM BOUSER,
ALBERT WEGNER.